United States Patent [19]

Tanaka

[11] Patent Number: 4,748,616
[45] Date of Patent: May 31, 1988

[54] METHOD AND ARRANGEMENT FOR TRANSMITTING AND EXTRACTING A TIMING SIGNAL

[75] Inventor: Osamu Tanaka, Tokyo, Japan

[73] Assignee: NEC Corporation, Tokyo, Japan

[21] Appl. No.: 864,837

[22] Filed: May 20, 1986

[30] Foreign Application Priority Data

May 20, 1985 [JP] Japan .................................. 60-108636

[51] Int. Cl.⁴ ............................................... H04J 1/02
[52] U.S. Cl. ....................................... 370/74; 370/98; 375/113
[58] Field of Search ........................... 370/74, 98, 100; 375/113; 455/37

[56] References Cited

U.S. PATENT DOCUMENTS 3,355,553 11/1967 Miyagi .................................. 370/74
3,702,379 11/1972 Peterson et al. ....................... 370/98
4,300,229 11/1981 Hirosaki .
4,438,511 3/1984 Baran .
4,618,996 10/1986 Rafal et al. ............................ 370/74

Primary Examiner—Douglas W. Olms
Assistant Examiner—Wellington Chin
Attorney, Agent, or Firm—Foley & Lardner, Schwartz, Jeffery, Schwaab, Mack, Blumenthal & Evans

[57] ABSTRACT

A method for transmitting and extracting a timing signal for use in a multi-carrier parallel data transmission system having the carrier frequencies of channels arranged at baud rate intervals. On a transmitting side, two pilot signals, whose frequency difference is an integral multiple of the baud rate, are inserted outside the signal band of said data transmission system and transmitted to a receiving side. On the receiving side, the frequency difference signal of said two pilot signals is taken out and is frequency-divided to extract a timing signal equal to the baud rate frequency. By this use of two pilot signals, it then becomes possible to transmit and extract a timing signal without sacrificing any of the valuable carriers contained within the data transmission band.

2 Claims, 4 Drawing Sheets

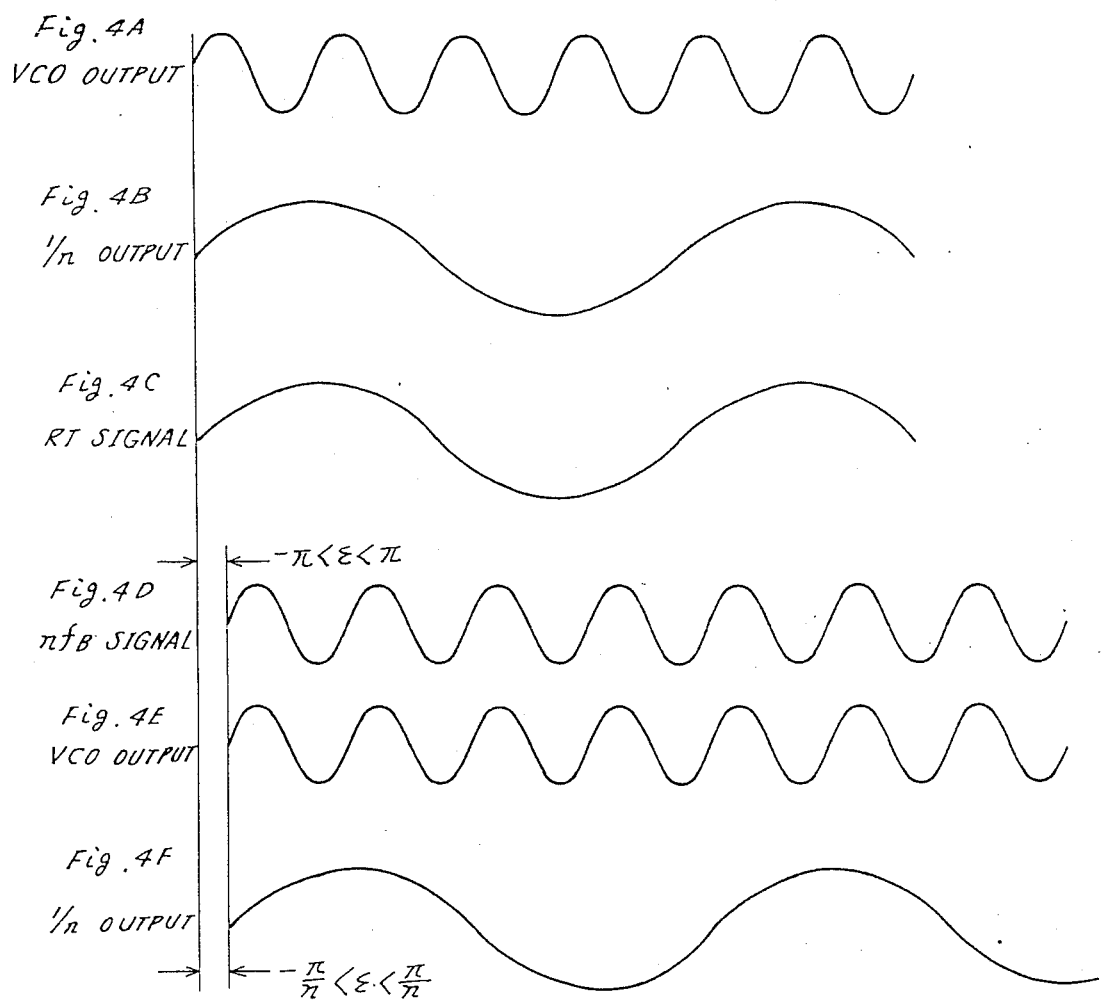

METHOD AND ARRANGEMENT FOR TRANSMITTING AND EXTRACTING A TIMING SIGNAL

BACKGROUND OF THE INVENTION

The present invention relates to a method and an arrangement for transmitting and extracting a timing signal, and finds particular application in a system for parallel data transmission by the use of a plurality of carriers.

Parallel data transmission over multiple carriers is attracting particular interest in recent years, as it permits transmission of a large amount of data over a transmission line limited in bandwidth, such as a telephone line. One example of a system for such parallel data transmission is described in the U.S. Pat. No. 4,438,511. In the prior art, the transmission and extraction of a timing signal for such a system is achieved by transmitting one of a plurality of carriers as a pilot signal for the timing signal on the transmitting side and extracting the pilot signal on the receiving side. However, such a method for transmitting and extracting a timing signal has the disadvantage that, because one of the carriers in a transmission band, which could otherwise be used for data transmission, is used as a pilot signal, the quantity of transmissible information is correspondingly reduced.

SUMMARY OF THE INVENTION

An object of the present invention, therefore, is to provide a method and an arrangement for transmitting and extracting a timing signal, which is capable of transmitting a timing signal without sacrificing any of the carriers within the band usable for data transmission as in the aforementioned instance.

According to the present invention, there is provided a method for transmitting and extracting a timing signal for use in a multi-carrier parallel data transmission system having the carrier frequencies of channels arranged at baud rate intervals. On a transmitting side, two pilot signals, whose frequency difference is an integral multiple of the baud rate, are inserted outside the signal band of said data transmission system and transmitted to a receiving side. On the receiving side, the frequency difference signal of said two pilot signals is taken out and is frequency-divided to extract a timing signal equal to the baud rate frequency.

BRIEF DESCRIPTION OF THE DRAWINGS

The above and other objects, features and advantages of the present invention will become apparent from the following detailed description when taken with the accompanying drawings in which:

FIGS. 4A to 4F are waveform diagrams for describing the operation of the control circuit.

DESCRIPTION OF THE PREFERRED EMBODIMENTS

Figure 1:
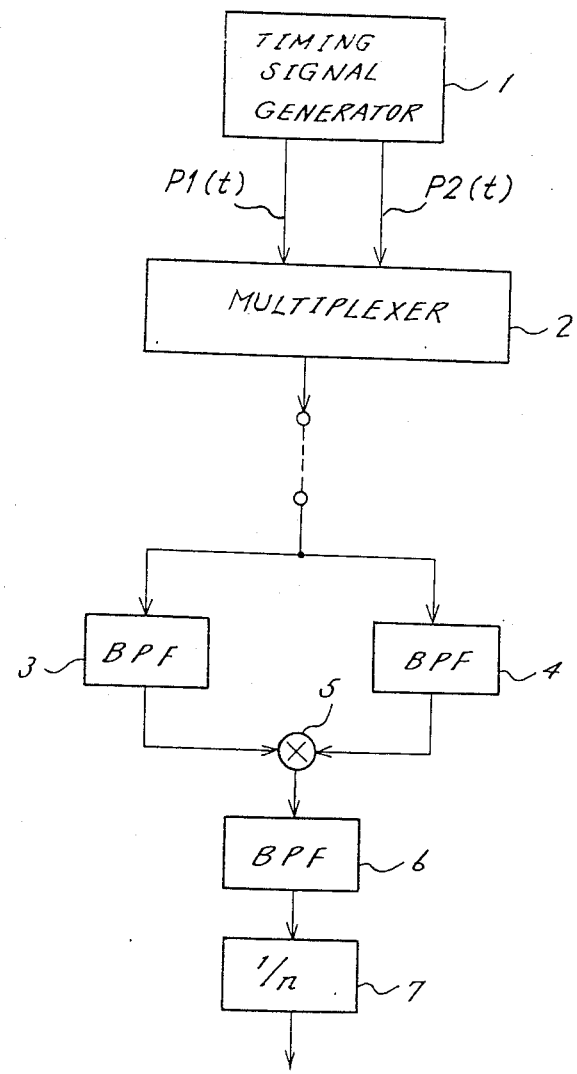
FIG. 1 is a circuit diagram illustrating a first preferred embodiment of the invention.

FIG. 1 illustrates a first preferred embodiment of the invention for use in a multi-carrier data transmission system. In the following description will be considered, as an example of data transmission system of this kind, a case in which the present invention is applied to what is shown in FIG. 1 of the U.S. Pat. No. 4,300,229. A transmitter has a timing signal generator 1 for generating two pilot signals P1(t) and P2(t). These pilot signals are multiplexed in a multiplexer 2 with modulated signals from a group of modulators (not shown).

Herein, the two pilot signals P1(t) and P2(t) are so selected that, as shown by the following pair of equations, the frequency difference between them is n-times (n is an integer) the baud rate frequency $f_B$ and that they are outside the signal band of the data transmission system:

$$P1(t) = \cos 2\pi f_0 t \\ P2(t) = \cos 2\pi (f_0 + nf_B)t \quad (1)$$

Where $f_0$ denotes a predetermined frequency outside the signal band.

Meanwhile a timing extractor has first and second band-pass filters (BPFs) 3 and 4 for respectively extracting the two pilot signals P1(t) and P2(t) from a multiplexed signal supplied from the multiplexer 2. A multiplier 5 multiplies the two pilot signals supplied from the BPFs 3 and 4. A BPF 6 takes out of the multiplication result of the multiplier 5 a timing carrier signal TCS of frequency $nf_B$, which is a signal equal to n times the baud rate $f_B$. A frequency divider 7 frequency-divides the timing carrier signal TCS to generate a timing signal.

Figure 2:
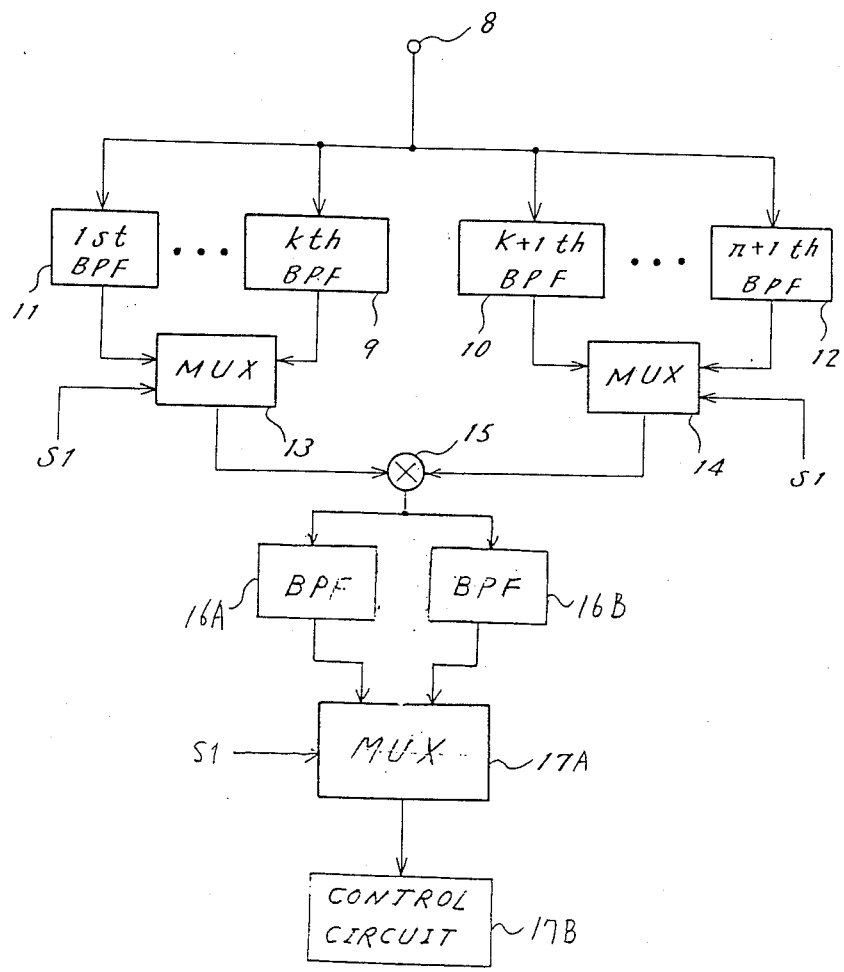
FIG. 2 is a circuit diagram illustrating a second preferred embodiment of the invention.

FIG. 2 illustrates a second preferred embodiment of the present invention. Since the timing signal transmitter of FIG. 1 can also be used in this second embodiment, FIG. 2 shows only the timing signal extractor. For the embodiment of FIG. 2, it is supposed that the timing signal generator 1 of FIG. 1 generates, in a first stage (training mode) prior to transmission of data, a first pair of pilot signals P1A(t) and P2A(t) whose frequency difference is identical with the baud rate $f_B$. The Kth and (K+1)th carriers $f_K$ and $f_{K+1}$ used in a group of modulators are transmitted as such pilot signals. P1A(t) and P2A(t) are selected using the following equations:

$$P1A(t) = \cos 2\pi f_K t$$

$$P2A(t) = \cos 2\pi f_{K+1} t$$

It is further supposed that, in a second stage (data transmission mode) after the start of data transmission, the timing signal generator 1 generates a second pair of pilot signals P1B(t) and P2B(t) whose frequency difference is an integral multiple of the baud rate $f_B$:

$$P1B(t) = \cos 2\pi f_0 t$$

$$P2B(t) = \cos 2\pi (f_0 + nf_B)t$$

Referring to FIG. 2, the first pair of pilot signals P1A(t) and P2A(t) supplied to an input terminal 8 are respectively extracted by BPFs 9 and 10, and supplied to multiplexers 13 and 14. The multiplexers 13 and 14 also receive outputs of BPFs 11 and 12 and select in the training mode the pilot signals P1A(t) and P2A(t) from the BPFs 9 and 10, respectively, in response to a selection signal S1. The pilot signals P1A(t) and P2A(t) are multiplied in a multiplier 15. The multiplication result is supplied to BPFs 16A and 16B having a center frequency of $f_B$ and $nf_B$. The BPF 16 extracts the baud rate signal BRS having a frequency of $f_B = f_{K+1} - f_K$, whereas the BPF 16B produces no signal because it has a different center frequency $nf_B$. The baud rate signal BRS is then supplied to a multiplexer 17A which selects the baud rate signal BRS in response to the selection signal S1, and the selected signal is fed to a control circuit 17B. The baud rate signal BRS, since it maintains the frequency and phase of the timing signal from the timing signal transmitter, will be hereinafter called the reference timing (RT) signal.

Meanwhile in the data transmission mode, the second pair of pilot signals P1B(t) and P2B(t) fed to the terminal 8 are respectively extracted by BPFs 11 and 12, and supplied to the multiplexers 13 and 14. The multiplexers 13 and 14 select the second pair of pilot signals and give them to the multiplier 15. The BPF 16B, like the BPF 6 in FIG. 1, takes out a timing carrier signal TCS having a frequency of $nf_B$ from the multiplication result of the multiplier 15 and feeds it to the control circuit 17B. Referring back to FIG. 1, the extractor shown therein obtains the timing signal of frequency $f_B$ by frequency-dividing the timing carrier signal TCS by n, so that the timing signal extracted has one of n possible phases, which does not concur with the phase of the timing signal transmitted from the timing signal transmitter. For this reason, in the second embodiment, a timing signal whose phase is closer to that of the timing signal from the timing transmitter is obtained by the use of the RT signal and the control circuit 17B. This feature will be described in detail with reference to FIGS. 3 and 4A to 4F.

Referring now to FIGS. 3 and 4A to 4F, in the training mode a terminal 23 receives the RT signal (FIG. 4C). A multiplexer 21 selects the output either of a frequency divider 20 (FIG. 4B) or of a voltage-controlled oscillator (VCO) 19 (FIG. 4A), and feeds the selected output to a multiplier 22. Supposing now that the multiplexer 21 selects the output of the frequency divider 20 in the training mode and that of the VCO 19 in the data transmission mode, it will supply the former to the multiplier 22 when the RT signal is received. The multiplier 22 will multiply the output of the frequency divider 20 and the RT signal, and give the result of multiplication to a loop filter 18. The filter 18 filters the output of multiplication to supply a control signal to the VCO 19. This structure enables the control circuit 17B to phase-synchronize the output of the frequency divider 20 with the RT signal.

Then, as the mode changes from training to data transmission, the timing carrier signal TCS (FIG. 4D) is fed to the terminal 23, and the multiplexer 21 supplies the output of the VCO 19 to the multiplier 22. At this time, since the phase of the timing carrier signal TCS generally differs from that of the VCO output by an initial phase difference $\epsilon(-\pi < \epsilon < \pi)$, the multiplier 22 and the filter 18 so control the VCO 19 to conform to the phase of the signal TCS. As the phase of the signal TCS and that of the output of the VCO 19 concur with each other, the frequency divider 20 produces a timing signal (FIG. 4F) resulting from the frequency division of the output of the VCO 19 by n. The phase difference between this timing signal and the RT signal is 1/n of the intitial phase difference $\epsilon$ between the signal TCS and the VCO output signal becoming negligibly small when n is relatively large number.

Figure 3:
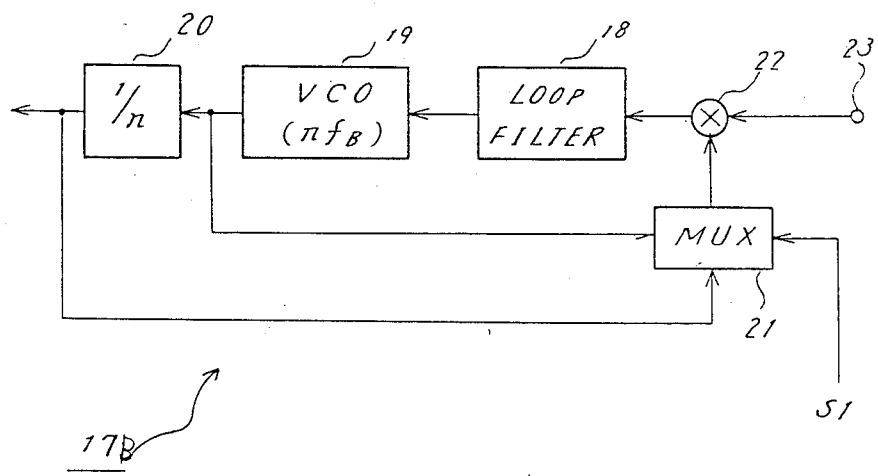
FIG. 3 is a diagram illustrating a control circuit for use in the second embodiment.

Now suppose an example in which $f_B = 200$ Hz, $n = 8$ and the initial phase difference $\epsilon = \pi$. If the circuit shown in FIG. 3 is used, the phase difference will be reduced to $\epsilon/n = \pi/8$ which is satisfactorily small while if it is not used, the difference will remain $\pi$.

A timing signal obtained in this manner can be used for carrier generation in the aforementioned multi-carrier data transmission system, or for the determination of sampling instants to extract the data values.

As hitherto described, the present invention, by the use of two pilot signals, makes it possible to transmit and extract a timing signal without sacrificing any of the valuable carriers within the data transmission band.

What is claimed is:

1. A method for transmitting and extracting a timing signal for use in a multi-carrier parallel data transmission system having the carrier frequencies of channels arranged at baud rate intervals, comprising the steps of:
   (a) transmitting two of said carriers as a first pair of pilot signals which have a first frequency difference equal to the baud rate;
   (b) taking out a first signal having a reference phase and a frequency equal to the first frequency difference from said first pair of pilot signals;
   (c) transmitting a second pair of pilot signals having a second frequency difference which is n times the baud rate;
   (d) taking out a second signal having a frequency equal to the second frequency difference from said second pair of pilot signals;
   (e) producing a third signal having any one of n possible phases and a frequency equal to the baud rate by frequency-dividing by n said second signal; and
   (f) extracting a timing signal having a phase, out of said n possible phases, closest to said reference phase and a frequency equal to the baud rate from said third signal.

2. Apparatus for transmitting and extracting a timing signal for use in a multi-carrier parallel data transmission system having the carrier frequencies of channels arranged at baud rate intervals, comprising:
   (a) means for generating a first pair of pilot signals having a first frequency difference equal to the baud rate when said transmission system is in a training mode and a second pair of pilot signals having a second frequency difference equal to n times the baud rate when said transmission system is in a data transmission mode, where n is an integer;
   (b) means for taking out a first signal having a reference phase and a frequency equal to the first frequency difference from said first pair of pilot signals;
   (c) means for taking out a second signal indicative of the second frequency difference from said second pair of pilot signals;
   (d) means for producing a third signal having any one of n possible phases and a frequency equal to the baud rate by frequency-dividing by n said second signal; and
   (e) means for extracting a timing signal having a phase out of said n possible phases, closest to said reference phase and a frequency equal to the baud rate from said third signal.

* * * * *